UNITED STATES PATENT OFFICE.

ALBERT G. MANNS AND FREDERICK C. KOCH, OF CHICAGO, ILLINOIS, ASSIGNORS TO ARMOUR & COMPANY, OF CHICAGO, ILLINOIS, A CORPORATION OF ILLINOIS.

PROCESS OF EXTRACTING SUPRARENALIN.

No. 829,220.     Specification of Letters Patent.     Patented Aug. 21, 1906.

Application filed December 23, 1904. Serial No. 238,076.

*To all whom it may concern:*

Be it known that we, ALBERT G. MANNS and FREDERICK C. KOCH, citizens of the United States, residing at Chicago, in the county of Cook and State of Illinois, have invented a certain new and useful Process of Extracting Suprarenalin from the Suprarenal Glands of Vertebrate Animals, of which the following is a specification.

This invention relates to a new and useful process of producing an extract of suprarenal glands in a physiological active and dry pulverulent or crystalline form.

Such extracts have heretofore been made and are variously known as "suprarenalin," "epinephrin," or "adrenalin," &c, and the product of the present process is in a general sense similar to the before-mentioned extracts, although it possesses certain characteristics of its own distinguishing it from other analogous products.

The object of the present invention is to provide a simple and practical process whereby the extract may be economically secu ed and a relatively large quantity obtained from a given weight of glands.

In carrying out our invention we first steep the finely-hashed glands in a dilute aqueous solution of acetic acid for a considerable period of time at a low temperature—say from 100° to 112° Fahrenheit. We next coagulate the proteid and matters contained in the fluid extract by heating the same to boiling. We then filter and concentrate the filtrate in vacuum to a thick syrup; next dilute the syrup by the addition of four to five volumes of alcohol (preferably wood-alcohol) and again filter; then again concentrate this alcoholic solution to a thick syrup in vacuum; then precipitate the active principle from this syrup by adding an aqueous solution of alkyl amins, such as monomethylamin or dimethylamin or trimethylamin until the solution becomes distinctly alkaline and gives off the smell of amin strongly. We finally separate the precipitated principle by filtering and then cleanse the same by washing with cold water, alcohol, and ether successively until a dry powder of minute crystals remains. These crystals constitute the product.

To state more explicitly the exact method or process which we have found best suited for the purpose, we first hash the glands finely and then steep the same in a five-percent. solution of acetic acid and water, using about two pounds of solvent for each pound of hashed glands and steeping for about two hours at a temperature of about 100° to 112° Fahrenheit.

The liquid extract is drawn off and the glands again steeped for a like period in a like solution for about the same length of time, and this operation is repeated until the glands have been subjected to four steepings, the liquid extract being in each case retained. The dilute aqueous acid extracts are then heated to the boiling-point and thereafter filtered rapidly. In this connection is to be noted that all work connected with the steeping and filtering must be done as rapidly as possible and with as little exposure to the air as practicable. The extracts should not be allowed to come in contact with iron vessels at least for any length of time.

We next evaporate the filtrates in a vacuum to such degree of concentration that for every one hundred pounds of glands there remains from two to three pounds of liquid. To the thick syrup obtatined by this concentration we now gradually add, while constantly stirring, the alcoholic washings from a previous batch (derived as explained below) and as much more ninety-five per cent. wood-alcohol as will equal four and one-half times the volume of the concentrated syrup to which it is added. The solution is then set aside in filled closely sealed or corked bottles and allowed to stand for a considerable period—say twelve hours. After thus standing the solution is filtered as rapidly as possible and thereafter evaporated to separate out the alcohol. The residue left on the filter-paper is transferred to a crock or other suitable non-oxidizing vessel and thoroughly mixed with recovered wood-alcohol, (that which has been previously used for this purpose is preferable,) which alcohol must test slightly acid toward litmus-paper and if found alkaline must be acidified by the addition of a few drops of acetic acid. It will be found desirable to use about one quart of alcohol for the residue derived from each one hundred pounds of suprarenal glands. This mixture is filtered and the filtrate set aside, the residue being again thoroughly mixed with fresh recovered alcohol and the alternate mixing and filtering repeated until the residue has been thus washed five times. The filtrates from these five washings are then mixed, to be added to the thick syrup, as described in connection with the first precipitation with wood-alcohol.

The combined alcoholic filtrates are evaporated in a vacuum-pan, preferably provided with a condenser and receiver to recover the alcohol. The evaporation is continued until a thick syrup remains, which is just sufficiently fluid to pour readily. We now add to the syrup a small quantity of water—say about fifty per cent. by volume—and evaporate again to the same consistency the syrup had before the addition of the water. We then again add water to such extent as to dilute the syrup sufficiently to permit free filtration by suction and then filter the liquid, preferably by the use of a large Buchner porcelain funnel—say of ten inches diameter—using suction to facilitate the filtering. Small quantities of water may be used to wash the filter, taking care to keep the volume of the liquid as small as possible. This filtrate liquid is now transferred to a precipitation-jar, (preferably a large wide-mouthed bottle,) which is set in ice-water, so as to cool the filtrate rapidly, the liquid being stirred thoroughly to facilitate even and rapid cooling. After the liquid has been thoroughly cooled we add in small amounts at a time a ten-per-cent. solution of alkyl amin, stirring well after each addition. The amin is added in this way repeatedly until the liquid gives off a distinct odor of the amin. After a vigorous stirring the precipitation of the extract will take place. In this connection it is to be noted that the precipitation-jar is kept in ice-water during the precipitation. The jar is now covered and set aside in a chill-room and allowed to stand for another twelve or fifteen hours.

The next step is to filter off and wash the precipitate, and in this connection it is important that the operation of filtering, washing, and drying be performed as rapidly and with as little exposure to the air as practicable. In filtering the clear supernatant liquid is first decanted off into a Buchner filter and filtered rapidly by suction. To the suprarenin sediment left in the precipitation-jar is added a small quantity of quite cold distilled water and the solution thoroughly mixed. After the decanted liquid has practically all passed through the Buchner filter this filtrate is set aside, and the mixture of water and precipitate is then placed in a filter and filtered by suction, as before. When nearly all of the liquid has passed through, but the filter-paper is still covered with liquid, another quart or so of the cold distilled water is added and allowed to run through, and this addition of small quantities of water is repeated until it has been performed about five times, when the filter is finally sucked dry. The moist precipitate from the filter is now transferred to a Hirsch funnel provided with hardened filter-paper, and in effecting this transfer the precipitate is washed from the Buchner filter by the use of a small stream of ninety-five per cent. wood-alcohol. This wood-alcohol is drawn through the Hirsch filter by suction and the precipitate washed three times more in the same manner with ninety-five per cent. wood-alcohol, using, say, one-half pint of wood-alcohol with each washing. (The alcohol used in these washings is preserved for future use after it has been redistilled.) To the almost dry precipitate one-half pound of light naphtha is added, allowed to soak through the precipitate, and sucked through the filter until the precipitate is dry. This operation of adding small quantities of naphtha is repeated five times, the naphtha being saved and redistilled. Following the last washing with naphtha air is drawn through the mass until the precipitate assumes the form of a dry powder.

The mother liquid, which is obtained by filtration after the solution has been treated with the alkyl amin and allowed to stand, is tested to determine whether or not it still contains unprecipitated suprarenalin. This is done by adding a small amount of alkyl amin while maintained at a low temperature and stirred continuously. If upon the addition of such alkyl amin further precipitate is formed, the mother liquid is set aside in the chill-room and allowed to stand from twelve to twenty-four hours and then again decanted and filtered, as in the first instance.

We claim as our invention—

1. An improvement in the art of extracting the active principle of suprarenal glands, which consists in first steeping the glands in an aqueous solution at a temperature below that at which albumen coagulates, next coagulating the proteid materials by bringing the solution to a coagulating temperature, and separating the coagulated substances from the solution, then condensing the solution by evaporation to a syrupy consistence, then diluting the solution with alcohol and separating the resultant precipitant, then again concentrating the filtrate by evaporation to a syrupy consistence, then precipitating the active principle by the addition thereto of alkyl amin and finally separating the precipitate from the liquid.

2. An improvement in the art of extracting the active principle of suprarenal glands in powdered form, which consists in first steeping the glands in a slightly-acidified aqueous solution at a temperature below that at which albumen coagulates, next coagulating the proteid materials by bringing the solution to a coagulating temperature, and separating the coagulated substances from the solution, next condensing the solution by evaporation to a syrupy consistence, next diluting the solution with alcohol and separating therefrom the resulting precipitant, then again concentrating the filtrate by evaporation to a syrup consistence, then precipitating the active principle by the addition thereto of alkyl amin, and finally separating the precipitate from the liquid and drying the precipitate.

3. An improvement in the art of extracting the active principle of suprarenal glands in powdered form, which consists in first steeping the glands in a slightly-acidified aqueous solution, coagulating the proteid materials therein by bringing the solution to a coagulating temperature, and separating the coagulated substances from the solution, then condensing the solution by evaporation in vacuum to a syrupy consistency, next diluting the solution with alcohol and filtering the resultant precipitant therefrom. then again concentrating the filtrate by evaporation in vacuum to a syrupy consistency, then precipitating the active principle by the addition thereto of alkyl amin, and finally recovering the precipitate by filtering it from the liquid and drying the same.

4. An improvement in the art of extracting the active principle of suprarenal glands in powdered form, which consists in repeatedly steeping the glands in a slightly-acidified aqueous solution at a temperature below that at which albumen coagulates, next coagulating the proteid materials by bringing the solution derived from the several steepings to a coagulating temperature for a brief period of time, next separating the coagulated substances from the solution, then condensing the solution by evaporation in vacuum, next diluting the solution with alcohol and filtering out the resultant precipitant, then again concentrating the filtrate by evaporation to a syrupy consistency, then chilling the solution and precipitating the active principle by the addition thereto of alkyl amin, then filtering out the resulting precipitate from the liquid, then washing the precipitate with water and a volatile liquid in succession and finally drying the powder.

5. An improvement in the art of extracting the active principle of suprarenal glands, which consists in first steeping the glands in an aqueous solution and separating the liquid from the residue, adding alcohol to the solution and filtering the resultant precipitant therefrom, concentrating the solution by evaporation in vacuum, and then precipitating the principle by the addition to the filtrate of alkyl amin, and finally separating the precipitant from the solution.

6. The improvement in the art of extracting the active principle of suprarenal glands which consists in precipitating said principle from a concentrated aqueous solution of the glands by adding thereto alkyl amin.

7. The improvement in the art of extracting the active principle of suprarenal glands, which consists in first steeping the glands in an aqueous solution at a temperature below that at which albumen coagulates, next coagulating the proteid materials by bringing the solution to a coagulating temperature, then separating the coagulated substances from the solution, then condensing the solution by evaporation to a syrupy consistency, then adding alcohol to precipitate inert organic substances and separating the resultant precipitant, then again concentrating the filtrate by evaporation to a syrupy consistency, then precipitating the active principle by the addition to the solution of one of the methylamins, and finally separating the precipitate from the liquid.

ALBERT G. MANNS.
FREDERICK C. KOCH.

Witnesses:
ALBERT H. GRAVES,
FREDERICK C. GOODWIN.